Oct. 24, 1950     W. L. R. HOLLINGSHEAD     2,527,422

LUBRICATING DEVICE

Filed Dec. 29, 1945

W. L. R. Hollingshead
Inventor by
T. Harold Sucher
Attorney

Patented Oct. 24, 1950

2,527,422

UNITED STATES PATENT OFFICE 2,527,422

LUBRICATING DEVICE

William Leslie Roy Hollingshead, Guelph, Ontario, Canada, assignor to The W. C. Wood Company Limited, Guelph, Ontario, Canada, a company of Ontario, Canada Application December 29, 1945, Serial No. 637,833

3 Claims. (Cl. 184—64)

This invention relates to a lubricating device and is particularly directed to providing a lubricating device in which the principle of capillary attraction is employed to deliver oil or other liquid lubricant from a reservoir to a part to be lubricated at a substantially uniform rate during the operation of that part and on ceasing such operation the flow of lubricant to the part automatically ceases.

Lubricating devices of the wick oiler type in which one end of a wick is immersed in liquid lubricant contained in a reservoir and the delivery end is suspended at a lower level in a conduit which communicates with a part to be lubricated, are well known and are widely employed for supplying liquid lubricant to a machine or an operating part of a machine or tool. Such devices have the advantages that they are inexpensive to manufacture and install, they are easily cleaned and filled, and liquid lubricant is delivered to the part to be lubricated at a substantially uniform rate as long as there is lubricant present in the reservoir. The wick oilers of the prior art, however, have the disadvantage that lubricant is delivered to the part to be lubricated as long as the end of the wick is in contact with lubricant in the reservoir regardless of whether the part to be lubricated is or is not operating unless some provision is made for stopping and starting the flow of lubricant when required, such as by a manually or automatically operated valve member in the oil conduit to the part to be lubricated.

It has been found that the delivery of oil to a part to be lubricated can be self-regulated by capillarity so that the flow of oil to the part to be lubricated stops and starts as the part stops and starts in its operation without the necessity of providing a manually or automatically operated valve member in the oil conduit.

One of the objects of this invention is to provide a lubricating device which is self-controlling to deliver liquid lubricant to a part to be lubricated during the operating period of such part and to stop the flow of such lubricant to the part when the part stops operating without the necessity of providing manually or automatically controlled valve members.

A further object of this invention is to provide a lubricating device which can be inexpensively manufactured and installed, easily kept cleaned and filled, and which delivers lubricant to a part to be lubricated at a substantially uniform rate and which is self-controlling to stop the delivery of such lubricant when the part to be lubricated ceases its operation.

The lubricating device of the present invention comprises, in general, a closed reservoir adapted to contain liquid lubricant, a tube extending upwardly into said reservoir to a point above the liquid level, a passageway in said tube, means for feeding liquid lubricant into said passageway, the outlet end of said passageway being of restricted diameter whereby a pressure on the surface of the liquid in the reservoir higher than that at the outlet end of said restricted passageway is necessary to cause lubricant to flow through said restricted portion of the passageway.

An understanding of the manner in which the above and other objects of the invention are attained may be had from the following description, reference being made to the accompanying drawings in which.

Like reference characters refer to like parts throughout the specification and drawing.

Figure 1:
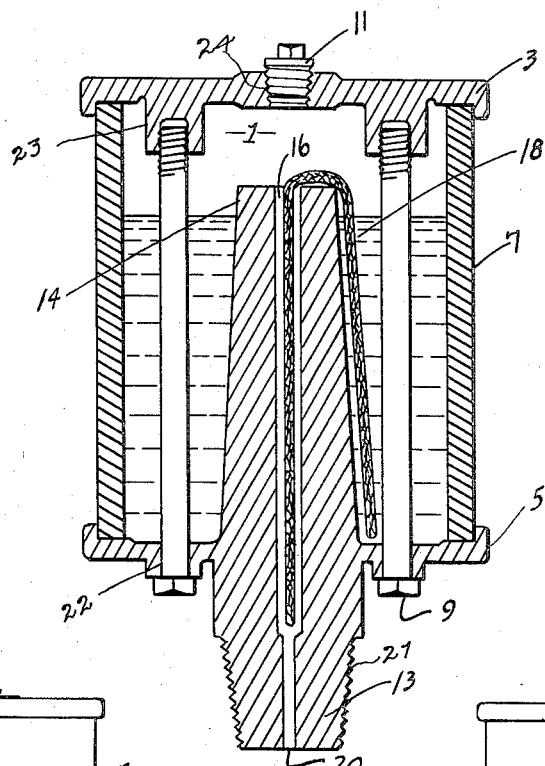
Figure 1 is a cross sectional elevation of a lubricating device of the wick oiler type incorporating the improvements of the present invention.

Referring to Figure 1 of the drawing, the lubricating device illustrated is in the form of a wick oiler and comprises a liquid lubricant reservoir 1 formed by a hollow body 7 supported on a base 5 and provided with a cover 3.

For ease and economy in manufacture, assembly and maintenance, the hollow body 7 is preferably in the form of a cylindrical shaped, open end body which may be of metal or, if desired, of transparent material such as glass.

The peripheries of the base 5 and of the cover 3 are preferably respectively upwardly and downwardly turned to provide seats in which the lower and upper ends of the body 7 may be received in a substantial air and fluid-tight relationship. Holes 22 are drilled in the base 5 and the cover 3 is formed with downwardly extending projections or bosses 23 which are internally drilled and tapped in alignment with the holes 22 in the base to receive the bolts 9 by means of which the parts are brought into and maintained in their air and fluid-tight relationship.

A threaded opening 24 extends through the cover, and is fitted with a removable plug 11.

The bottom flange 5 is formed with a stem or tube 13 which extends from below the base upwardly into the reservoir to a point adjacent to the cover. This tube 13 may be formed in one piece with the base or may be in the form of a separate piece extended through the base in the air and fluid-tight relationship therewith. In filling the reservoir with liquid lubricant, the liquid level is maintained below the top of the extension or tube 13.

The tube 13 is provided with a passageway 16—20 which extends therethrough, the portion of the passageway 16 being of larger diameter than the portion 20 and being adapted to receive the delivery end of the wick 18 which extends from the reservoir into the passageway 16.

The passageway 20 which communicates with the passageway 16 and which is of restricted diameter, being in effect a capillary tube, extends from below the delivery end of the wick to the part to be lubricated.

The lower end of the tube 13 is preferably threaded as indicated by the numeral 21 for attachment of the device to a machine or part to be lubricated with the outlet end of the passageway 20 being in communication with the part to be lubricated.

Figure 2:
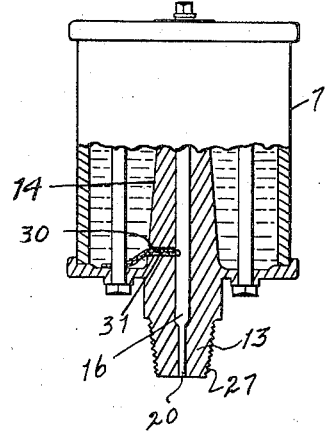
Figure 2 is a fragmentary cross sectional elevation of an alternative modification of the invention.

In the modification of the invention illustrated in Figure 2 a passageway 30 is drilled through the wall of the stem 14 adjacent to the base of the reservoir. This passageway may be filled with a wick 31 or other material having capillary properties. The operation of this modification of the invention is similar in all respects to the modification illustrated in Figure 1 with the difference that the wick 18 is replaced by the much shorter wick 31.

Figure 3:
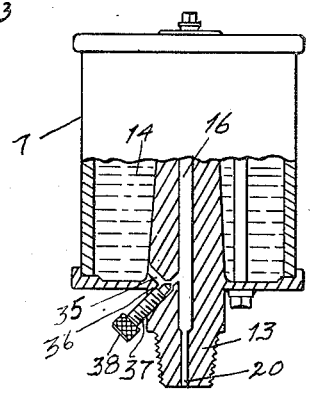
Figure 3 is a fragmentary cross sectional elevation of a further alternative modification of the invention.

In the further modification of the invention illustrated in Figure 3, passageway 35 is drilled through the wall of the stem 14 approximate to the base of the reservoir. A second passageway 36 is drilled through the stem exteriorly of the reservoir and extends to the passageway 35. A needle valve 37 is threaded into the passageway 36, the tapered end of the needle valve closing the passageway 35 when in fully tightened position. The needle valve may be operated exteriorly of the reservoir by turning the enlarged end 38. In this modification, oil flows by gravity during the operation of the part to be lubricated from the reservoir through the passageway 35 to the restricted passageway 20, the rate of flow being regulatable by adjustment of the needle valve 37.

In the construction of the device, the portion 20 of the passageway which extends through the stem 13 is in effect a capillary tube, the diameter being restricted such that the flow of oil through and out of this restricted passageway is due to a difference of pressure between the interior of the reservoir and the interior of the conduit, or pump, or motor or the like to which the device is attached, and this difference in pressure causes the lubricant to flow freely through the passageway 20 to the part to be lubricated and when this pressure is equalized, the restricted passageway 20 is of insufficient diameter to permit the lubricant to flow by gravity therethrough, that is, the size of the passageway 20 is restricted such that the oil fed into the inlet end of this restricted passageway fills the passageway and the surface tension of the lubricant seals the passageway against the entrance of air into the reservoir. For example, in employing the device to lubricate the vacuum pump of a milking machine, the pressure within the pump, or within the conduits attached to the pump, is not constant during operation of the pump and, therefore, there is a continual transfer of air to and from the interior of the reservoir by way of the passageway which terminates in the restricted portion 20. If it were not for these pressure variations, lubricant would not flow through the restricted passageway.

The maximum permissible size of the passageway 20 is dependent upon the viscosity and temperature of the lubricant employed and may be designed readily to function satisfactorily under any given conditions. For example, in employing the lubricating device to deliver lubricant to a vacuum pump used for driving a milking machine, the following conditions were observed:

| Viscosity | | Leaking Size of Orifice |
|---|---|---|
| Saybolt at 100° F. | Kin. (100° F.) | |
| 180.3 | 38.8 | .219 |
| 315 | 68.17 | .265 |
| 572 | 124 | .296 |

Where the leaking size of the orifice represents the maximum diameter of the passageway 20 above which the lubricant of the type specified would continue to flow from the delivery end of the wick 18 through the passageway 20 to the part to be lubricated when the pressure on the surface of the lubricant in the reservoir and at the outlet end of passageway 20 are approximately equal and below which the surface tension of the drop of lubricant at the outlet end of the passageway would be sufficient to seal the passageway. In determining the size of the orifice, consideration must be given to possible variations in atmospheric temperature. For example, if there is an increase in temperature during periods of non-use, the air in the reservoir would expand and the increased pressure would force lubricant out of the restricted passageway 20. Conversely, if the temperature lowers, the contraction in the volume of air in the reservoir would cause the lubricant in the restricted passageway to be drawn or forced upwardly towards the delivery end of the wick until equilibrium is again established. It is found, however, that leakage of oil incidental to temperature changes is very minor and of no practical importance.

It is found in the operation of the device, that with the level of the liquid lubricant below the top rim of the tube 13, lubricant will be delivered to the part to be lubricated as long as air is admitted to the reservoir such as through the opening 24 or passageway 37 or other air inlet to the reservoir. When the supply of air to the reservoir is cut off, such as by insertion and/or tightening of the plug 11 or needle valve 38, the surface tension of the drop of lubricant serves to seal the restricted passageway 20 and thus stop the flow of lubricant through that passageway. If desired, of course, provision can be made to close the air inlet to the reservoir automatically and simultaneously with the stopping of the part to be lubricated provided the bore of passage 20 bears the proper relation to the viscosity of the lubricant used.

As a specific modification of the lubricating device of the present invention, the device may be used to lubricate a vacuum pump. During the operation of the pump, the pressure in the passage 20 is reduced to the pressure of the suction side of the pump which may be of the order of about 15″ of mercury while substantially atmospheric pressure is applied to the surface of the liquid lubricant in the reservoir.

As a result of this pressure difference between the outlet end of the passageway 20 and the space above the lubricant in the reservoir, the oil delivered to the passageway 20 flows freely and rapidly through that passageway to the part to be lubricated. When the pressure in these two parts of the device are equalized by cutting off the air supply to the reservoir, the lubricant fills the restricted passageway and seals that passageway against the entrance of air to the reservoir.

It will be understood that modifications may be made in the preferred embodiment of the invention described and illustrated herein without departing from the scope of the invention as defined by the appended claims. For example, the device can be used to lubricate machines and parts of machines other than vacuum pumps and provision can be made, if desired, for cutting off the air supply to the oil reservoir automatically with the stopping of the part to be lubricated.

What I claim as new and desire to protect by Letters Patent of the United States is:

1. An automatic lubricating device which comprises a closed container adapted to provide a reservoir for liquid lubricant, an inlet opening for said container and means for closing said opening, a tube in said container extending vertically from a point below the bottom thereof to a point above the level of the lubricant therein, a passageway in said tube open at the upper end and terminating at its lower end in a passageway of more restricted diameter having an open outlet, said first mentioned passageway providing a secondary reservoir adapted to contain a small quantity of lubricant and said second mentioned passageway being of a restricted diameter insufficient to permit the flow of lubricant by gravity alone under the weight of the column of lubricant in said secondary reservoir, whereby the flow of lubricant through said restricted passageway is caused by a pressure on the surface of the lubricant in the secondary reservoir higher than the pressure at the outlet end of the restricted passageway, and means for feeding lubricant to said secondary reservoir as it flows from said restricted passageway.

2. An automatic lubricating device which comprises a closed container adapted to provide a reservoir for liquid lubricant, an inlet opening for said container and means for closing said opening, a tube in said container extending vertically from a point below the bottom thereof to a point above the level of the lubricant therein, a passageway in said tube open at the upper end and terminating at its lower end in a passageway of more restricted diameter having an open outlet, said first mentioned passageway providing a secondary reservoir adapted to contain a small quantity of lubricant and said second mentioned passageway being of a restricted diameter insufficient to permit the flow of lubricant by gravity alone under the weight of the column of lubricant in said secondary reservoir, whereby the flow of lubricant through said restricted passageway is caused by a pressure on the surface of the lubricant in the secondary reservoir higher than the pressure at the outlet end of the restricted passageway, and a wick extending from the lubricant in the reservoir into the secondary reservoir.

3. An automatic lubricating device which comprises a closed container adapted to provide a reservoir for liquid lubricant, an inlet opening for said container and means for closing said opening, a tube in said container extending vertically from a point below the bottom thereof to a point above the level of the lubricant therein, a passageway in said tube open at the upper end and terminating at its lower end in a passageway of more restricted diameter having an open outlet, said first mentioned passageway providing a secondary reservoir adapted to contain a small quantity of lubricant and said second mentioned passageway being of a restricted diameter insufficient to permit the flow of lubricant by gravity alone under the weight of the column of lubricant in said secondary reservoir, whereby the flow of lubricant through said restricted passageway is caused by a pressure on the surface of the lubricant in the secondary reservoir higher than the pressure at the outlet end of the restricted passageway, and conduit means extending from the lower part of the reservoir to the secondary reservoir.

WILLIAM LESLIE ROY HOLLINGSHEAD.

REFERENCES CITED

The following references are of record in the file of this patent:

UNITED STATES PATENTS

| Number | Name | Date |
|---|---|---|
| 804,203 | Brown | Nov. 14, 1905 |
| 1,092,164 | Organ | Apr. 7, 1914 |
| 2,068,168 | Ekbom | Jan. 19, 1937 |